(12) United States Patent
Sastry et al.

(10) Patent No.: US 7,984,776 B2
(45) Date of Patent: Jul. 26, 2011

(54) ENERGY STORAGE AND CONTROL SYSTEM FOR A VEHICLE ELECTRIFIED DRIVETRAIN

(75) Inventors: Ann M. Sastry, Ann Arbor, MI (US); James H. Beyer, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 253 days.

(21) Appl. No.: 12/059,187

(22) Filed: Mar. 31, 2008

(65) Prior Publication Data

US 2008/0248918 A1    Oct. 9, 2008

Related U.S. Application Data

(60) Provisional application No. 60/909,396, filed on Mar. 30, 2007.

(51) Int. Cl.
*B60K 1/04* (2006.01)
(52) U.S. Cl. .................. 180/65.1; 180/65.22; 180/65.29
(58) Field of Classification Search .................. 180/65.1, 180/65.24, 65.29, 65.265, 65.28
See application file for complete search history.

(56) References Cited

U.S. PATENT DOCUMENTS

| | | | |
|---|---|---|---|
| 5,710,504 A * | 1/1998 | Pascual et al. | 180/65.8 |
| 5,710,699 A * | 1/1998 | King et al. | 363/132 |
| 6,683,389 B2 * | 1/2004 | Geis | 290/40 C |
| 6,962,224 B2 * | 11/2005 | Nakanowatari | 180/65.225 |
| 7,185,591 B2 * | 3/2007 | Kumar et al. | 105/35 |
| 7,533,745 B2 * | 5/2009 | Laeuffer | 180/65.29 |
| 7,688,074 B2 * | 3/2010 | Cox et al. | 324/426 |
| 7,819,213 B2 * | 10/2010 | Oyobe et al. | 180/65.27 |
| 2008/0218104 A1 * | 9/2008 | Lukic et al. | 318/139 |
| 2009/0160247 A1 * | 6/2009 | Nakamura et al. | 307/9.1 |

* cited by examiner

*Primary Examiner* — Jeffrey J Restifo
*Assistant Examiner* — Erez Gurari
(74) *Attorney, Agent, or Firm* — Richard T. Ogawa; Ogawa P.C.

(57) ABSTRACT

A system for supplying electrical energy to a partial or a total electrified drivetrain of a vehicle, the system may include an energy storage system having an energy storage system output that is excess of an operating voltage of the electrified drivetrain. A first converter having an input coupled to the energy storage system output and a first converter output that is at an operating voltage of the electrified drivetrain. Optionally, a supplemental storage bank may be coupled to the first converter output. A second converter is coupled to the supplemental storage bank to provide an output at an operating voltage of the electrified drivetrain and at a peak operating current of the electrified drivetrain.

14 Claims, 2 Drawing Sheets

ENERGY STORAGE AND CONTROL SYSTEM FOR A VEHICLE ELECTRIFIED DRIVETRAIN

CROSS-REFERENCE TO RELATED APPLICATIONS

This application claims priority to and benefit from U.S. Provisional Patent Application Ser. No. 60/909,396, filed Mar. 30, 2007, entitled Control System for an Electric, Hybrid Electric or Plug-in Electric Vehicle, the disclosure of which is hereby incorporated herein by reference for all purposes.

TECHNICAL FIELD

This patent relates to vehicles having total or partial electrified drivetrains, including without limitation electric, hybrid electric and plug-in hybrid electric vehicles. In particular, this patent relates to a control system for an electrified drivetrain for a vehicle and an associate energy storage system.

BACKGROUND

Electric vehicles (EV), hybrid electric vehicles (HEV) and plug-in hybrid vehicles (PHEV) have been suggested as a means to reducing fossil fuel consumption and the potential adverse environmental implications. PHEV technology is attractive because it offers potential benefits of an all-electric vehicle, while preserving the range and flexibility of an internal combustion engine powered vehicle.

HEV and PHEV systems are not able presently to provide all power demands, for example during heavy acceleration, because of the power supply limitations of the battery technology. Additionally, the battery technology itself still adds significantly to vehicle mass and consumes a substantial portion of storage space within the vehicle.

The design of an electrical energy storage system for an electrified drivetrain of an electric or hybrid electric vehicle poses significant challenges. Existing vehicle electrical energy storage systems, primarily single chemistry lead-acid, nickel metal hydride, lithium and the like are inadequate. Other electrical energy storage technology, such as employed in small scale applications like consumer electronics, can inform the design of energy storage systems for electrified drivetrain leaves many questions unanswered. The suggestion of a battery structure, i.e., chemistry, cell configuration, construction, size and shape, suitable for consumer electronics, for example, may not scale to provide a solution to the vehicle energy storage system designer.

Design issues including cell and module robustness, safety, aging, lifetime, thermal effects, material/shelf life, shock and vibration resistance and general suitability in a vehicle environment all come into play. Issues of system scale also exist. Load requirements in a consumer electronic device may be relatively small, while electrified drivetrain systems may demand power delivery in the 20-100 kiloWatt range at 300-400 volts and significantly high load currents of 200 amps or more. A vehicle environment is also an extreme use environment subjecting the system to temperature extremes, changing temperatures, shock and vibration and, of course, crashes. Costs including initial installation and future replacement are also of concern. Selection and usage of materials should be made with a view toward sustainability, i.e., use of materials that are fundamentally abundant and reusable.

The typical energy storage/battery system of electric (EV), hybrid electric (HEV) or plug-in hybrid (PHEV) electric vehicle is limited to a single storage system or module with a single cell chemistry and architecture. To meet the many diverse operating conditions the vehicle might experience, the designer necessarily compromises in selecting the battery system. The resulting drawbacks are less than optimal energy delivery, volumetric size, weight and operating complexity (number and configuration of cells, cell monitoring for health and failure, etc.).

DETAILED DESCRIPTION

An optimized control and energy storage system can potentially significantly increase the performance of vehicles incorporating EV, HEV and PHEV technology.

Figure 1:
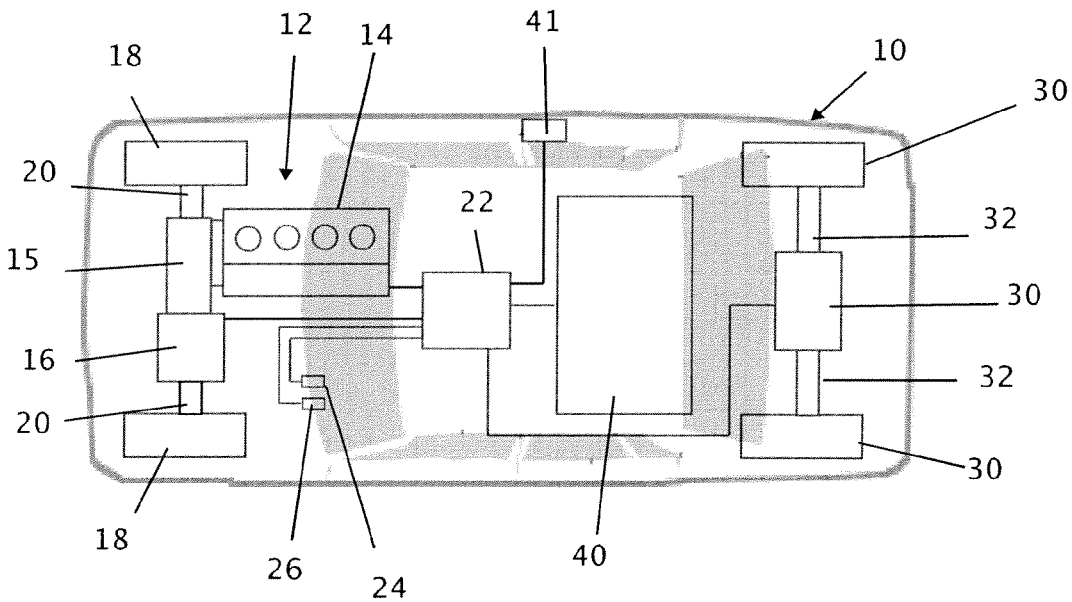
FIG. 1 is a schematic diagram of vehicle including an electrified drivetrain and associated electrical energy storage system and control system in accordance with embodiments of the invention.

FIG. 1 is schematic of a vehicle 10 incorporating an electrified drivetrain 12, and in particular a hybrid electrified drivetrain. Embodiments of the present invention have application to virtually any vehicle incorporating a completely electrified (EV) or partially electrified (HEV) drivetrain including plug-in type electrified drivetrains. The vehicle 10 is illustrated and described only as a single possible implementation of an embodiment of the present invention. It is understood that numerous other configurations of the vehicle 10 and the electrified drivetrain 12 are possible.

The electrified drivetrain 12 includes an internal combustion engine 14 coupled to a variable speed transmission 15 and traction motor 16 to drive the front wheels 18 of the vehicle 10 via propulsion shafts 20. The transmission 15 and the traction motor 16 are coupled to a controller 22 responsive to inputs from an accelerator control 24 and a brake control 26 accessible to the vehicle operator. While FIG. 1 depicts a single traction motor 16 coupled to the transmission 15, multiple traction motors may be used, for example one each associated with the wheels 18. As FIG. 1 depicts, a traction motor 28 may be provided to drive rear wheels 30 via propulsion shafts 32, the traction motor 28 being coupled to the controller 22. Alternative configurations of the electrified drivetrain 12 may provide for primary driving of the rear wheels 30 via the transmission 15 and traction motor 16, driving of the front wheels 18 and the rear wheels 30 and various combinations driving the front wheels 18 and/or the rear wheels 30 via a variable speed transmission and traction motors.

Electric energy is supplied to the traction motor 16 and the traction motor 28 (if provided) from an energy storage system 40 via the controller 22. The energy storage system 40 may include a plurality of battery cells.

Electric energy may be provided to the energy storage system 40 by operating the traction motor 16 in a generating mode driven by the internal combustion engine 14. Energy may further be recovered and delivered to the energy storage system 40 during vehicle breaking by operating the traction motor 16 and/or traction motor 28 in a regenerative breaking mode. Energy also may be provided to the energy storage system 40 via a plug-in option via a plug-in interface 41.

Figure 2:
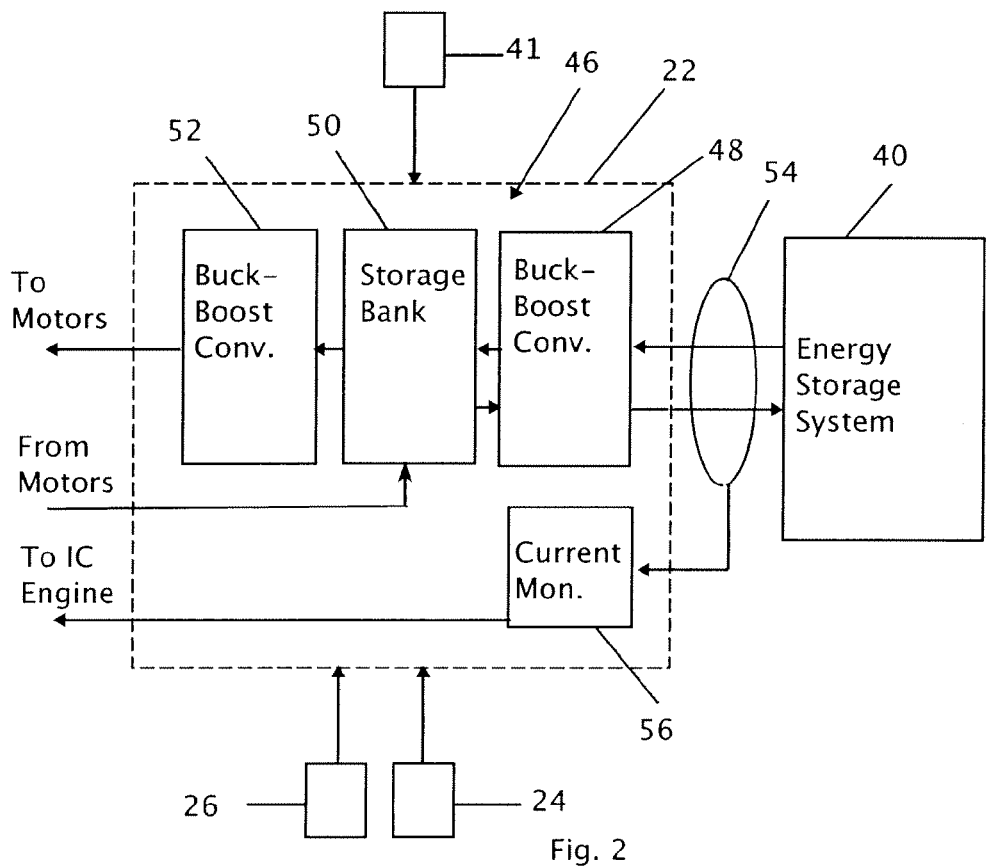
FIG. 2 is a block diagram illustration of a power control system for an electrified drivetrain for a vehicle in accordance with embodiments of the invention.

Referring to FIG. 2, the controller 22 of the vehicle 10 may incorporate a first buck-boost DC-DC converter 48, an energy storage bank 50 and a second buck-boost DC-DC converter 52 to the motors 16/30 as part of an energy delivery system 46.

The converter 48 is not configured to boost voltage, as has been done in previous systems. Instead, the energy storage system 40 is configured to have an excess voltage capacity relative to the operating requirements of the electrified drivetrain 12. For example, the energy storage system 40 may be configured as a string of battery cells series coupled to have a relatively high voltage. For example, it may contain 1000 cells at 1.2 volts per cell, and may provide 10 amps at 1200 volts. The total energy storage system 40 may therefore be 12 kiloWatt-hrs.

The converter 48 reduces energy storage system 40 voltage to a voltage less than the energy storage system 40 voltage. The converter 48 output voltage may be at the operating voltage of the electrified drivetrain 12. For example, the converter 48 may reduce the energy storage system 40 voltage 4:1, from 1200 volts at 10 amps to 300 volts at 40 amps, consistent with the described example. The voltage output of the converter 48 may thus be at a value that well supports operation of a typical electrified drivetrain including those used in EV, HEV or PHEV vehicles. Moreover, its nominal current output may be at the average value required by the electrified drivetrain without unduly stressing the cells of the energy storage system 40.

The converter 48 may be any suitable type buck-boost converter, and for example, it may be zero-voltage switching (ZVS), bi-directional DC-to-DC converter. The later circuit advantageously has low component count, allows for regenerative breaking (provided by the bidirectionality) and has high efficiency.

The converter 48 allows for slower current draw from the energy storage system 40 while still meeting nominal current requirements of the electrified drivetrain 12. However, the converter 48 and energy storage system 40 still may not able to meet peak current requirements of the electrified drivetrain, such as seen under heavy acceleration. To meet the high current demand, the second energy storage system 46 may include a supplemental storage bank 50. The storage back 50 may be an assembly of battery cells, an assembly of ultra capacitors back 22, one or more modules of batteries and/or capacitors. In a preferred implementation, the storage bank 50 is a bank of ultra capacitors, for example, 14.8 Farads, and capable of delivering up to 200 amps for up to 5 seconds.

Heavy acceleration from 0 kilometers per hour (kph) to 60 kph, for example, may require a peak current draw for up to 5 seconds. However, this peak current could be as high as 200 amps. The capacitor bank 22 need only provide the current difference between the nominal current able to be drawn from the energy storage system 40 and the peak current demand. It therefore may be sized accordingly. In the instant example, with a peak current of 200 amps and a nominal current capacity of 40 amps as an output of the converter 48, the storage bank 50 may need only to provide 160 amps for 5 seconds. A preferred capacitor type is one of the ultra or super capacitor types that does not store charge on conductive plates but instead by partially ionizing an electrolytic fluid.

The converter 52 receives an output of the storage bank 50 (the combined outputs of the storage bank 50 and the converter 48), and it provides the necessary current, 200 amps at 300 volts, to meet peak acceleration requirements of the electrified drivetrain 12.

A current sensor 54 may be provided and coupled to sense the current input and/or the current output of the energy storage system 40 and to provide an output indicative of the current flow to a current monitor 56 of the controller 22. The current monitor 56 may provide a signal to the IC engine 14 to start and/or stop to add charge to the energy storage system 40 and/or to provide additional driving torque to the wheels 30 via the transmission 15.

Figure 3:
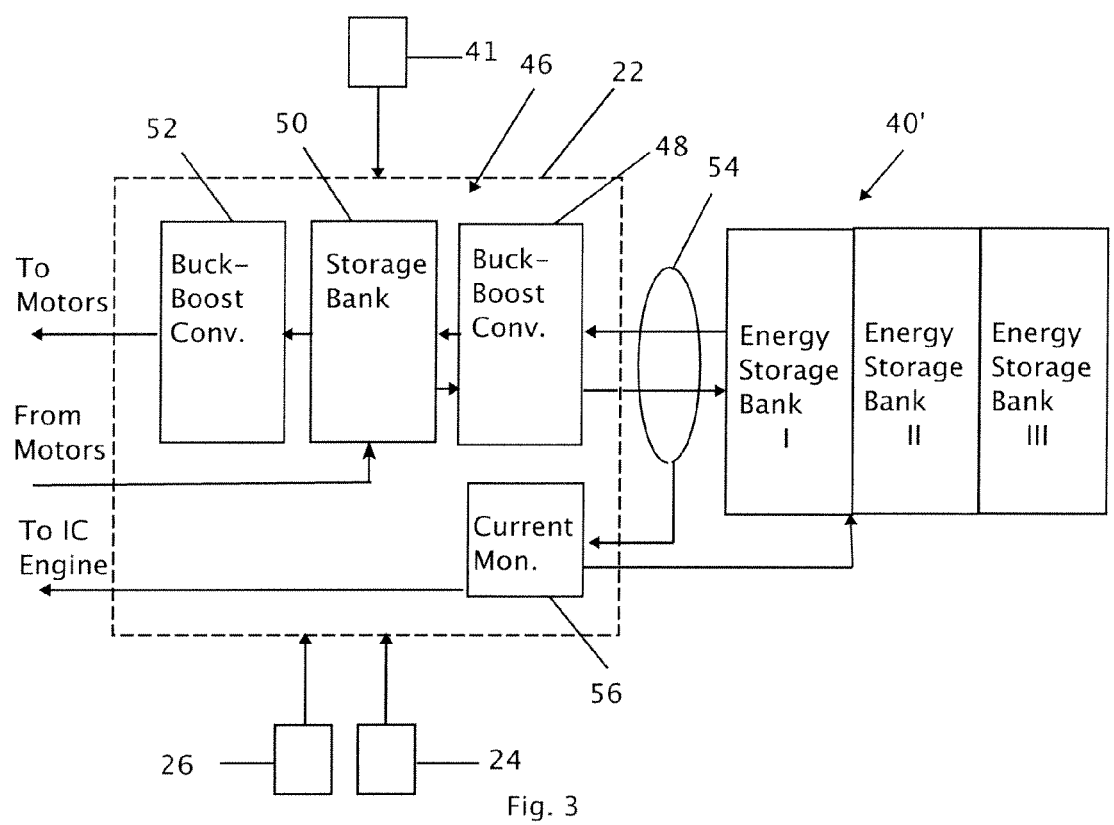
FIG. 3 is a block diagram illustration of a power control system for an electrified drivetrain for a vehicle coupled to a multi-bank energy storage system in accordance with embodiments of the invention.

FIG. 3 illustrates an alternative embodiment of an energy storage system 40' coupled to the controller 22. Instead of the single large energy storage system 40, multiple switched banks, banks I, II and III may be provided. The banks I, II and III may be selectively combined in series or parallel as energy needs demand. Each of the multiple banks I, II and III need not be of the same architecture, and can be a combination of chemistries, cell number and configuration, etc. In one example using LI-ion cells, a 14.5 kiloWatt-hrs energy requirement of the electrified drivetrain 12 could be split into 3 banks of 2420 volts at 2 amp-hours. Each bank would therefore require 672 cells. As a bank becomes depleted, as sensed by the current sensor 54 and current monitor 56, for example, the current monitor 56 may provide a signal to the energy storage system 40' to switch out the depleted bank with a fresh bank. The banks could be similarly recharged.

While the invention is described in terms of several preferred embodiments of mounting assemblies that may be used in connection with fault protection devices, it will be appreciated that the invention is not limited to such devices. The inventive concepts may be employed in connection with any number of devices and structures. Moreover, while features of various embodiments are shown and described in combination, the features may be implemented individually each such single implementation being within the scope of the invention.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. §112, sixth paragraph.

We claim:

1. A system for supplying electrical energy to a partial or a total electrified drivetrain of a vehicle, the system comprising:

an energy storage system having an energy storage system output, the energy storage system output having voltage in excess of a operating voltage of the electrified drivetrain;

a first converter having an input coupled to the energy storage system output and a first converter output, the first converter output being at the operating voltage of the electrified drivetrain;

a supplemental storage bank having an input coupled to the first converter output and a storage bank output, the storage bank output comprising the first converter output combined with a supplemental operating current; and a second converter having an input coupled to the storage bank output and a second converter output, the second converter output being at the operating voltage of the electrified drivetrain and at a peak operating current of the electrified drivetrain.

2. The system of claim 1, the supplemental storage bank comprising a bank of ultra capacitors.

3. The system of claim 1, the supplemental storage bank being coupled to be charged by the electrified drivetrain.

4. The system of claim 1, the energy storage system comprising batteries.

5. The system of claim 1, comprising the energy storage system comprising a first battery module and a second battery module.

6. The system of claim 4, the first battery module and the second battery module being coupled to provide the energy system voltage.

7. The system of claim 4, the first battery module and the second battery module being individually selectable to provide the energy system voltage.

8. The system of claim 6, comprising a current monitor coupled to monitor a current output of the energy storage system and to affect selection of the first battery module or the second battery module.

9. The system of claim 1, comprising a current monitor coupled to monitor a current output of the energy storage system and to affect operation of an internal combustion engine of the electrified drivetrain.

10. The system of claim 1, wherein the energy storage system voltage is greater than the operating voltage of the electrified drivetrain.

11. The system of claim 1, wherein the energy storage system voltage is four times the operating voltage of the electrified drivetrain.

12. A method of supplying electric energy to an electrified drivetrain of a vehicle, the method comprising:
    down converting an energy storage system output to provide a down converted energy storage system output at an electrified drivetrain operating voltage, and
    coupling the down converted energy storage system output to the electrified drivetrain;
    supplementing the down converted energy storage system output with a supplemental operating current to provide a supplemented energy storage system output; and
    converting the supplemented energy storage system output to an electrified vehicle peak operating output.

13. The method of claim 12, comprising providing the energy storage system voltage from one of a selectable plurality of energy storage banks.

14. The method of claim 12, the energy storage system output is greater than the down converted energy storage system output.

* * * * *